(12) United States Patent
Steele et al.

(10) Patent No.: US 9,163,185 B2
(45) Date of Patent: Oct. 20, 2015

(54) GASIFICATION OF A CARBONACEOUS MATERIAL

(71) Applicant: SRI International, Inc., Menlo Park, CA (US)

(72) Inventors: Daniel Steele, Stanford, CA (US); Robert B. Wilson, Palo Alto, CA (US); Ripudaman Malhotra, San Carlos, CA (US); Brian Adair, Menlo Park, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 59 days.

(21) Appl. No.: 14/012,627

(22) Filed: Aug. 28, 2013

(65) Prior Publication Data

US 2015/0060335 A1  Mar. 5, 2015

(51) Int. Cl.
*C10G 3/00* (2006.01)
*C10G 50/00* (2006.01)

(52) U.S. Cl.
CPC . *C10G 50/00* (2013.01); *C10G 3/42* (2013.01)

(58) Field of Classification Search
CPC .................................. C10G 50/00; C10G 3/42
See application file for complete search history.

(56) References Cited

U.S. PATENT DOCUMENTS

| | | | | |
|---|---|---|---|---|
| 4,049,734 | A * | 9/1977 | Garwood et al. | 518/703 |
| 2011/0095233 | A1* | 4/2011 | Hildebrandt et al. | 252/373 |
| 2012/0053378 | A1* | 3/2012 | O'Rear | 585/302 |

OTHER PUBLICATIONS

Gandrik, Assesment of the SRI Gasificaiton Process for Syngas Generation with HGTR integration, Apr. 2012.*

* cited by examiner

*Primary Examiner* — Randy Boyer
*Assistant Examiner* — Juan Valencia
(74) *Attorney, Agent, or Firm* — Richard Aron Osman

(57) ABSTRACT

The invention provides methods and apparatus ultimately for converting a carbonaceous material to liquid hydrocarbons suitable for use, for example, as transportation fuels. In a first step the carbonaceous material is converted to a syngas product, and in subsequent steps the syngas product is converted to the desired liquid hydrocarbons. In one embodiment, coal and methane are converted to syngas, and the syngas product is converted to hydrocarbons through a methanol intermediate. An example use for the methods and apparatus of the invention is in the preparation of aviation fuels.

19 Claims, 3 Drawing Sheets

GASIFICATION OF A CARBONACEOUS MATERIAL

CROSS REFERENCE TO RELATED APPLICATIONS

This application is a continuation of PCT application PCT/US2011/27070, filed Mar. 3, 2011, the contents of which are incorporated herein in its entirety.

BACKGROUND

Coal reserves in the U.S. are sufficient to meet anticipated transportation fuel needs for the foreseeable future. However, despite increased costs and security concerns associated with relying on imported petroleum, no company has built a U.S. facility to produce transportation fuel from coal.

Coal liquefaction methods, also known as coal-to-liquid (CTL) methods, refer to the process of converting coal into hydrocarbon liquids. The hydrocarbon products are typically used as transportation fuels, and include diesel fuels and jet fuels. For some CTL methods, coal gasification is a companion process that plays an important initial role by converting the coal to syngas, which is a mixture of $H_2$ and CO. Typically, coal gasification is carried out in a gasification reactor into which coal is injected either by a gas-blown system or water slurry. Gas-blown systems typically use air to blow the coal into the hot zone in the gasifier. The syngas product is converted to transportation fuels via one of several methods (for example, in the Fischer-Tropsch process) depending on a variety of factors.

Current CTL methods emit substantial amounts of $CO_2$ and consume large quantities of water. The insufficient hydrogen content of coal (H/C~0.4-0.8) relative to transportation fuels such as JP-8 (H/C~1.9, where for simplicity JP-8 is assumed to have the average formula $C_{11}H_{21}$) means that any process that purports to convert all, or substantially all, of the carbon in coal into carbon in JP-8 requires an additional source of hydrogen. To make transportation fuel, current CTL plants typically produce additional hydrogen in a post-gasification unit using the water-gas shift (WGS) process that consumes water and CO to produce $H_2$ and $CO_2$. The $CO_2$ emissions increase further when plants convert $H_2$ and CO to $CO_2$ and hydrocarbons using Fischer-Tropsch synthesis (FTS), which produces a broad distribution of hydrocarbons and requires additional investment to convert fractions outside of the diesel range to diesel.

Current CTL technologies are not carbon-efficient. In a conventional indirect approach for coal to transportation fuels through FTS, as much as ⅔ of the carbon in the coal is emitted as $CO_2$ (a 100,000 BPD plant would produce 136 million lb of $CO_2$ per day). Because of these expensive process units, current CTL plants require~$80,000 in capital per barrel/day of capacity.

There remains a need for converting coal to liquids at a competitive price on a large scale (e.g., 100,000+ barrel-per-day) in a method that produces little or no $CO_2$ emissions and consumes little or no water. Preferred methods would be capable of using a variety of carbonaceous inputs and would be readily scalable to any desired level of output.

BRIEF SUMMARY OF THE INVENTION

The methods described herein are intended to address one or more of the above mentioned drawbacks of current CTL methods, and to satisfy one or more of the above mentioned needs.

In some embodiments, there is provided a process for liquefying a carbonaceous material comprising: (a) combining the carbonaceous material with methane and water in a gasification reactor to produce $H_2$ and CO; (b) combining the $H_2$ and CO from (a) with a catalyst in a methanol reactor to produce methanol; (c) combining the methanol from (b) with a catalyst in a reactor to form hydrocarbons and water; and (d) recycling the water formed in (c) to the gasification reactor to react with additional carbonaceous material and methane.

In some embodiments of the aforementioned process, the carbonaceous material is coal.

In some embodiments of the aforementioned process, the gasification reactor is supplied with heat energy from an electric heat producing means.

In some embodiments of the aforementioned process, the hydrocarbons comprise propylene, and wherein the process further comprises isolating the propylene and combining the propylene with a catalyst in a reactor to form hydrocarbons in the molecular weight range of transportation fuels.

In some embodiments of the aforementioned process, the hydrocarbons are in the molecular weight range of transportation fuels.

In some embodiments of the aforementioned process, the coal/methane ratio is between about 1.75 and about 20.

In some embodiments of the aforementioned process, at least 75% of the methane and at least 75% of the coal is converted to CO or $CO_2$ and water in the gasification reactor.

In some embodiments of the aforementioned process, at least a portion of the water in (a) is in the form of steam, and wherein the steam is added to the gasification reactor at a temperature greater than about 500° C.

In some embodiments of the aforementioned process, the $H_2$ and CO product from (a) has a CO/$H_2$ ratio in the range of 0.35/1 to 2.5/1.

In some embodiments of the aforementioned process, the process is water neutral.

In some embodiments of the aforementioned process, the contents of the gasification reactor are maintained above an average temperature of at least 1200° C.

In some embodiments of the aforementioned process, an oxidized catalyst is further added to the gasification reactor, and wherein the oxidized catalyst reacts with a portion of the methane or coal in the gasification reactor to generate heat.

In some embodiments of the aforementioned process, the methane is provided in the form of a gas stream and wherein the coal is entrained in the methane gas stream.

Furthermore, in some embodiments, the invention provides a process for converting a carbonaceous material to transportation fuel, the process comprising combining the carbonaceous material, methane, and water at elevated temperature in a gasification reactor to produce CO and $H_2$ in a CO/$H_2$ ratio of between 0.35/1 and 2.5/1, wherein one or more of the carbonaceous material, methane, and water is heated using an electric heat generating means, and wherein the CO and $H_2$ product of the gasification reactor has an adjustable ratio and is used to prepare a transportation fuel.

In some embodiments, the CO and $H_2$ products from the above-described processes are converted to methanol in a methanol reactor. Furthermore, in some embodiments, $CO_2$ is present in the stream that is converted to methanol, such that the overall processes consume $CO_2$. The $CO_2$ may be obtained from any suitable source, including environmental $CO_2$ as well as products from other processes described herein (e.g. conversion of methane and carbonaceous material to syngas).

Furthermore, in some embodiments, the invention provides a gasification reactor for converting a carbonaceous material to syngas comprising: (a) a reactor chamber; (b) means for supplying the carbonaceous material to the reactor chamber; (c) means for supplying methane to the reactor chamber; (d) means for supplying water to the reactor chamber; and (e) means for supplying electricity-generated heat energy to the carbonaceous material, methane, water, or combination thereof.

In some embodiments of the aforementioned processes and apparatus, the carbonaceous material is coal.

In some embodiments of the aforementioned processes and apparatus, the reactor chamber of the gasification reactor has a volume of at least $1.0 \text{ m}^3$.

In some embodiments of the aforementioned processes and apparatus, the methods further comprise means for supplying to the gasification reactor chamber an oxidized catalyst suitable to oxidize methane and generate heat.

In some embodiments of the aforementioned processes and apparatus, the water is supplied as high pressure and high temperature steam.

In some embodiments of the aforementioned processes and apparatus, the means for supplying water is configured to take water from a propylene reactor that produces propylene and water from methanol.

Furthermore, in some embodiments, the invention provides a liquefaction system for converting a carbonaceous material to a hydrocarbon fuel, the liquefaction system comprising: (a) a gasification reactor; (b) a purification stage configured to receive an output from the gasification reactor; (c) a methanol reactor configured to receive an output from the purification stage; (d) a propylene reactor configured to receive an output from the methanol reactor; and (e) a fuel reactor configured to receive an output from the propylene reactor, wherein the gasification reactor has an inlet for receiving an entrained flow of a carbonaceous material in gaseous methane and an inlet for receiving steam.

In some embodiments of the aforementioned processes and apparatus, the gasification reactor is configured to receive electrical energy, and comprises a means for converting the electrical energy to heat energy.

Other aspects of the invention will be apparent from the description that follows, including the claims and examples.

DETAILED DESCRIPTION OF THE INVENTION

Figure 1:
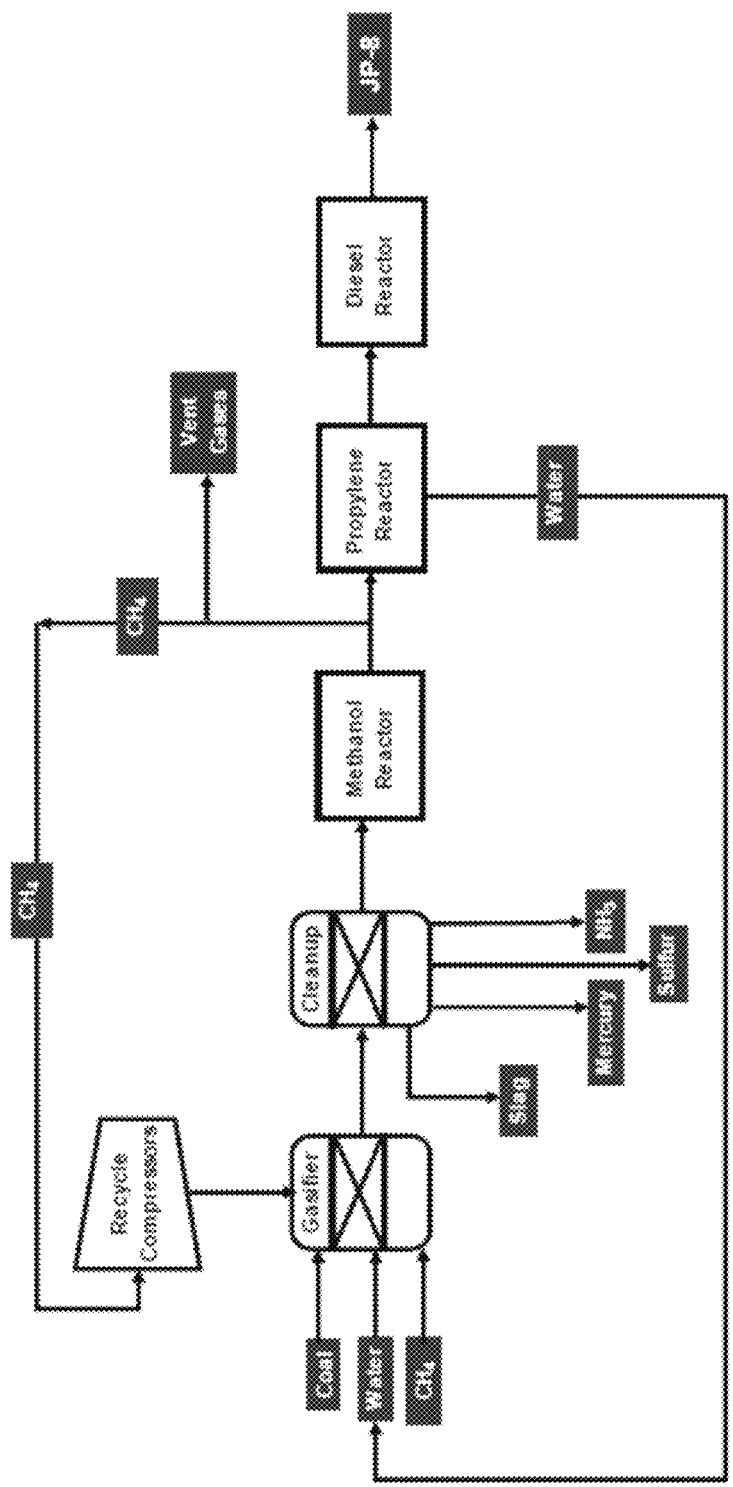
In FIG. 1, a block diagram is provided that illustrates one embodiment of the invention. Coal, steam, and methane enter a gasifier and are converted to a syngas output that is converted downstream to a transportation fuel.

It is to be understood that the terminology used herein is for the purpose of describing particular embodiments only, and is not intended to be limiting.

The term "typically" is used throughout the specification to indicate common practices of the invention. The term indicates that such disclosure is exemplary, although (unless otherwise indicated) not necessary for the materials and methods of the invention. Thus, the term "typically" should be interpreted as "typically, although not necessarily." Similarly, the term "optionally" as in a material or component is optionally present indicates that the invention includes instances wherein the material or component is present, and also includes instances wherein the material or component is not present.

In some embodiments, the invention provides methods and apparatus for producing hydrocarbon liquids from a carbonaceous material. In some embodiments the hydrocarbon liquids are transportation fuels.

In some embodiments, the invention provides methods and apparatus for producing syngas from a carbonaceous material. In preferred embodiments, the syngas product has a $CO/H_2$ ratio that is suitable for production of methanol from the syngas.

In some embodiments, the invention provides methods and apparatus for producing methanol from a carbonaceous material via a syngas intermediate.

In some embodiments, the invention provides methods and apparatus for producing propylene from a carbonaceous material.

In some embodiments, the invention provides methods and apparatus for producing transportation fuels from a carbonaceous material. Such methods proceed via a syngas intermediate, may further involve a methanol intermediate, and may further involve a propylene intermediate. In some embodiments, the methods and apparatus of the invention are water neutral or water producing. In some embodiments, the invention provides methods and apparatus for producing transportation fuels from a carbonaceous material wherein the methods do not consume water. In some embodiments, the invention provides methods and apparatus for producing transportation fuels from a carbonaceous material wherein the methods are $CO_2$ neutral or consume $CO_2$. In some embodiments, the invention provides methods and apparatus for producing transportation fuels from a carbonaceous material wherein the methods do not produce $CO_2$. In some embodiments, the invention provides methods and apparatus for producing transportation fuels from a carbonaceous material wherein the methods are both water and $CO_2$ neutral, or produce water and consume $CO_2$.

In some embodiments, the invention provides methods and apparatus for operating a coal gasification reactor supplied with electrically-generated heat energy.

In some embodiments, the invention provides methods and apparatus for producing transportation fuels from a carbonaceous material wherein little or no $CO_2$ is generated by the net process.

Throughout this application, coal is used as an exemplary carbonaceous material suitable for use in the methods and apparatus of the invention, although such use is not intended to be limiting. Unless otherwise specified or obvious from the context, the disclosure applies to coal as well as other carbonaceous materials, examples of which are provided below.

Apparatus

The methods and apparatus of the invention involve reacting coal inside a gasification reactor. The gasification reactor (also referred to herein as a "gasifier") comprises inlet ports and outlet ports that allow the reactants to enter and the products to exit. The gasification reactor further comprises a reaction chamber within which the reactants are allowed to react. The gasification reactor may further comprise additional elements such as insulation, sensors, pollution control measures, and the like.

In some embodiments, the gasifier comprises: a reactor chamber; means for supplying coal to the reactor chamber; means for supplying methane to the reactor chamber; means for supplying water to the reactor chamber; and means for supplying heat energy to the coal, methane, water, or a combination thereof. For example, a means for supplying any of the abovementioned components may comprise one or more conduits connected to a source of the material to be supplied. The source may be a reservoir of virgin feedstock, or may be a downstream process that has one of the reactants as an output (and which output is captured and recycled to the gasifier). As used herein, the term "reactants" refers to one or more materials that are supplied to the gasifier (e.g., coal, methane, water, etc.).

The gasifier typically further comprises one or more means for extracting a reaction product from the gasifier. Typically, such means comprises one or more outlet ports in communication with conduits. In some embodiments, the outlet conduit or outlet port of the gasifier comprises a means for purifying the output stream (e.g., filters, scrubbers, etc.).

In some embodiments, the reaction chamber of the gasification reactor has a volume greater than $0.5\ m^3$, or greater than $1.0\ m^3$, or greater than $5.0\ m^3$, or greater than $10\ m^3$, or greater than $20\ m^3$. In some embodiments, the reaction chamber of the gasification reactor is of a size suitable for commercial-scale gasification of coal. By "commercial-scale" is meant that the reactor is large enough to accommodate a throughput suitable for commercial production of gasification products. Thus, the reaction chamber is larger than a laboratory-scale reaction chamber, which is typically significantly smaller than $1.0\ m^3$.

In some embodiments, the input to the gasification reactor comprises a solid phase and a non-solid phase. The solid phase comprises coal and may further comprise an optional catalyst. Typically, the solid phase is in the form of particles as described below. The non-solid phase comprises liquids and/or gases and in some embodiments the non-solid phase serves to entrain or fluidize the solid phase. In some embodiments, the non-solid phase is entirely gaseous. Typically, the non-solid phase comprises a hydrogen source and an oxidant, more details of which are provided below. The solid and non-solid phases are typically combined prior to entering the gasification reaction chamber, although in some embodiments they may be supplied separately.

In some embodiments of the present invention, the input to the gasifier is fed to the gasifier through one or more conduits that is/are in communication with one or more inlet ports of the gasifier. In some embodiments, each conduit is in communication with only one inlet port, although in other embodiments it may be desirable to split the flow through a conduit such that one or more input components enters the gasifier through more than one inlet port.

As mentioned herein, in some embodiments the solid phase comprises coal. Typically, the coal is fed to the gasifier in the form of particles. Such particles may be prepared from mined coal by any appropriate means, such as crushing or milling units commonly used in coal processing. In some embodiments the coal particles fed to the gasifier may be characterized as having an average diameter within the range of between about 10 µm to about 100 mm, or between about 0.1 mm to about 5 cm, or between about 1 mm to about 5 cm, or between about 1 cm to about 4 cm. For example, the average diameter may be greater than 10 µm, or greater than 0.1 mm, or greater than 1 mm, or greater than 10 mm, or greater than 1.5 cm, or greater than 2 cm, or greater than 3 cm, or greater than 5 cm. Also for example, the diameter may be less than 10 cm, or less than 5 cm, or less than 4 cm, or less than 3 cm, or less than 2 cm, or less than 1 cm, or less than 0.5 cm, or less than 1 mm, or less than 0.1 mm. The term "average diameter" refers to the widest dimension of the particles. When the coal is in the form of aggregated particles, the term "average diameter" refers to the widest dimension of the aggregates.

Typically, the solid phase is entrained by the non-solid phase—i.e., the solid phase is carried into and through the gasification reactor in a flow of gas and/or liquid. The invention also applies, however, to embodiments wherein the solid phase is fluidized by the non-solid phase (i.e., the flow of gas/liquid is sufficient to separate the solid phase particles such that they behave as a fluid, but there is little or no bulk flow of the solid particles through the reactor), as well as to embodiments wherein the solid phase is maintained in a fixed bed (i.e., the solid phase remains immobile within the reactor chamber). In entrained flow operations, the solid and non-solid phases are supplied to the gasifier together, whereas in fluidized and fixed bed operations the solid phase and non-solid phase may be supplied to the reactor separately.

In some embodiments, the solid phase is fed to the gasifier at a loading in the range of about 15 wt % to about 50 wt %, or about 25 wt % to about 40 wt %, wherein such percentages are measured with respect to the non-solid phase. For example, the solid phase loading may be greater than about 15%, or greater than about 20%, or greater than about 25%, or greater than about 30%, or greater than about 35%, or greater than about 40%, or greater than about 45%. Furthermore, the solid phase loading may be less than about 50%, or less than about 45%, or less than about 40%, or less than about 35%, or less than about 30%, or less than about 25%, or less than about 20%.

As mentioned previously, the non-solid phase input to the gasifier typically comprises a hydrogen source and an oxidant. In some embodiments, the hydrogen source is a hydrocarbon. Examples of suitable hydrocarbons are lower hydrocarbons, and particularly those that are gaseous under the reaction conditions of the gasifier such as methane, ethane, propane, butane, and the like. In preferred embodiments, the hydrogen source is methane. Furthermore, in preferred embodiments, the hydrogen source is not $H_2$. For example, the hydrogen source is not $H_2$ produced by a water-gas shift reaction (i.e., $CO+H_2O \rightarrow CO_2+H_2$). Thus, in preferred embodiments, $H_2$ is not obtained and added to the reactants separately from the hydrogen source. It will be appreciated, however, that depending on the origin of the hydrocarbon used as a hydrogen source, small amounts of $H_2$ may be present in the hydrocarbon. For example, methane obtained from natural gas fields may contain $H_2$, and this does not adversely affect the methods of the invention. In some embodiments, although water may be present in the gasification reactor (as the oxidant—see below), water is not the hydrogen source. Thus, the hydrogen atoms from the water are not converted to $H_2$ in the overall reaction.

The non-solid phase input to the gasifier further comprises an oxidant. In some embodiments, the oxidant is water, particularly in the form of steam. In preferred embodiments, the oxidant is not $O_2$ or a gaseous mixture containing significant amounts of $O_2$ (i.e., air). It will be appreciated, however, that water used as the oxidant may contain small amounts of $O_2$. Typically such small amounts need not be separated from the input water stream, as there is little or no adverse effect on the methods of the invention.

In some embodiments, the input to the gasification reactor further comprises a catalyst. For example, an oxidation catalyst may be added to the input stream in order to partially oxidize the methane or carbonaceous material. Such oxidation can be used to provide heat to the gasifier. Such oxidation can also be used, in some embodiments, to obtain more complete conversion of the methane or coal reactants to CO and $CO_2$. Appropriate catalysts include, for example, robust catalyst such as the mixed metal oxides and transition metal catalysts that are used in the chemical process industry for selective oxidations (e.g., ammoxidation). In addition, robust oxidation catalysts used in the emission control industry could be used, including such catalysts as "2-way catalysts" and others. Other catalysts include alkali metal compounds such as alkali metal hydroxides. Oxidation catalysts are typically available from commercial sources (e.g., Johnson Mathey or BASF) but may alternatively be synthesized in-house. Specific examples of catalysts include vanadium phosphorus oxide (VPO), γ-FeOOH, and $Bi_2MoO_6$.

The coal is reacted in the gasifier with a hydrogen source and an oxidant at elevated temperature. In some embodiments, the hydrogen source is methane and the oxidant is steam. Furthermore, in some embodiments, the sole oxidant entering the gasifier is steam (i.e., no other oxidants such as oxygen, air, etc. are added). These and other examples are described in more detail herein. When the gasifier is operated in an entrained flow mode, the coal particles typically enter the gasifier at the bottom of the gasifier and are carried upwards by the mobile phase. As will be understood by those of skill in the art, in one preferred method of operation, the coal particles will react as they flow upward through the reaction chamber. The speed of reaction of the coal particles and the size of the coal particles are adjusted such that the coal particles have completely reacted (and have therefore disappeared) just prior to reaching the top or outlet port of the gasifier. In such a setup, the input flow to the gasifier comprises a slurry of coal particles in a non-solid (e.g., gaseous) phase, and the output flow of the gasifier comprises gases only. When the gasification reactor is operated in a fluidized bed or fixed bed mode, coal particles will typically also be added to the gasifier near the bottom of the reactor; such addition may occur separately (i.e., though a separate port) from addition of the non-solid phase.

In some embodiments, an output of the gasification reactor is a gaseous mixture that comprises CO and $H_2$ and is commonly referred to as syngas. Further disclosure describing the products of the gasifier is provided below.

In some embodiments, the methods and apparatus of the invention further comprise a purification stage. The purification stage is in fluid and/or gaseous communication with the gasifier. The purification stage receives an output stream from the gasification reactor, such output being entirely gaseous or a mixture of gases and solid particles and/or liquids.

The syngas output of the gasifier may comprise one or more impurities in initial concentrations. Examples of such impurities include slag, mercury, ammonia, sulfur, sulfur-containing compounds such as $H_2S$ and COS, and ash. Other impurities may be present depending on the type and source of coal that is used. When such impurities are present in an amount that could negatively affect downstream processes, the syngas output of the gasifier may be sent to a purification stage.

The purification stage typically comprises scrubbers, catalysts, absorbents, or other means for purification, or combinations thereof. Such methods of purification are generally known in the art, although purification methods currently or later developed may also be employed.

In some embodiments, the purification stage comprises a reactor chamber within which one or more methods of purification (such as those previously mentioned) may be carried out on the gasifier output stream. In other embodiments, the purification stage does not comprise a separate reaction chamber, but rather comprises one or more purification means in-line with the conduits that carry the gasifier output stream out of the gasifier and to the next processing or storage stage.

The output of the purification stage is typically a gaseous product stream having one or more impurities at final concentrations, wherein the final concentration of one or more of the impurities is significantly reduced from the initial concentration. For example, the output of the purification stage in some embodiments is a syngas comprising one or more impurities (e.g., mercury, ash, etc. as described previously) at concentrations 10 times less, or 20 times less, or 50 times less, or 100 times less, or greater than 100 times less than the concentrations of those impurities at the output of the gasifier (i.e., the input of the purification stage). It will be appreciated that, where the purification stage comprises a reaction chamber, impurity levels of the "output" stream of the purification stage can be measured at the outlet of the reaction chamber. Alternatively, where the purification stage does not comprise a reaction chamber, impurity levels of the "output" stream of the purification stage can be measured at the point of input to the next stage in the process.

In some embodiments, the methods and apparatus of the invention further comprise a methanol reactor. The methanol reactor is configured to accept an output stream from the purification stage (when the purification stage is present) or from the gasifier directly (when the purification stage is not present). Thus, either directly or via the purification stage, the methanol reactor is in fluid/gaseous communication with the gasification reactor. In some embodiments, the methanol reactor is in fluid/gaseous communication with the gasification reactor such that fluid/gas products from the gasification reactor (e.g., syngas) can be transmitted to the methanol reactor, or such that fluid/gas products from the methanol reactor (e.g., isolated methane) can be transmitted to the gasification reactor. In some embodiments, two separate conduits connect the methanol reactor with the gasification reactor, such that fluids/gases can be transmitted in both directions.

Typically, the stream that enters the methanol reactor comprises syngas, and the methanol reactor converts the syngas to methanol. Various methods for conversion of syngas to methanol are known in the art, and may be used in conjunction with the present invention. It will be appreciated that the physical characteristics of the methanol reactor (e.g., size, number and type of inlet ports, etc.) as well as the operating conditions (e.g., temperature, pressure, etc.) will vary depending upon the method that is selected. For example, one method for forming methanol from syngas uses a catalyst (e.g., a mixture of copper, zinc oxide, and alumina), high temperatures (e.g., 250° C.), and high pressures (e.g., 5-10 MPa). In some embodiments and in an industrial setting, the gasifier is operated at a sufficiently high pressure such that no additional compression is required to meet the methanol reactor's operating pressure. The yield of methanol is thermodynamically limited, so the product must be removed in a high-pressure separation before the remaining syngas is recycled back to the methanol reactor.

The output of the methanol reactor comprises methanol. The methanol is captured and transferred to the next stage in the process, which in some embodiments is a propylene reactor and is described in more detail below. The methanol may also be captured and used in other processes as desired.

In some embodiments, the output of the methanol reactor further comprises residual methane. In some embodiments, residual methane in the output stream of the methanol reactor is separated from the main product stream and is recycled back to the gasifier. Accordingly, in such embodiments the methanol reactor comprises a means for separating methanol from methane in the output of the reactor, and there is a fluid/gaseous connection that allows methane to be transmitted back to the gasifier. The recycling pathway may comprise, in some embodiments, a compressor and/or heater that increases the pressure and/or temperature of the methane prior to being supplied to the gasifier. The recycled methane stream may be combined with the virgin methane being supplied to the gasifier, or may be fed to the gasifier through a separate inlet port.

The output of the methanol reactor may further comprise hydrogen, as well as varying amounts of one or more additional components such as carbon monoxide, carbon dioxide, water/steam, inert gases, etc. Such components may be removed from the output stream by conventional methods as needed. In some embodiments, both the hydrogen and methane are separated from the methanol in the output stream of the methanol reactor. The hydrogen and methane are recycled back to the gasifier. In some embodiments, only the methane is separated from the methanol reactor output stream and recycled back to the gasifier.

In some embodiments, the input stream to the methanol reactor (i.e., the output stream from the gasifier or purification stage) additionally comprises carbon dioxide. In such embodiments, the output of the methanol reactor may further comprise water, and the water output may be captured and recycled to the gasifier if desired.

In preferred embodiments, the syngas product from the gasifier has a ratio suitable for direct conversion to methanol. That is, it is not necessary to add additional hydrogen or to otherwise adjust the $CO/H_2$ ratio of the syngas product from the gasifier prior to the syngas entering the methanol reactor. Thus, in some embodiments, methanol is produced without the need for production of $H_2$ from a water-gas shift reaction. As described previously, the $CO/H_2$ ratio in the syngas product can be adjusted, for example, by adjusting the methane-to-coal ratio of the feedstock.

In some embodiments, the methods and apparatus of the invention further comprise a propylene reactor. The propylene reactor is configured to accept an output stream from the methanol reactor. Thus, the propylene reactor is in fluid/gaseous communication with the methanol reactor.

Typically, the stream that enters the propylene reactor comprises methanol and may further comprise water. The propylene reactor converts the methanol to propylene. A variety of methods are known for conversion of methanol to propylene, and these may be used in conjunction with the present invention. An example is the Methanol-to-Propylene (MTP®) technology developed by Lurgi GmbH. It will be appreciated that the physical characteristics of the propylene reactor (e.g., size, number and type of inlet ports, etc.) will vary depending upon the method that is selected.

In some embodiments, propylene is produced by a self-condensation of methanol followed by an elimination of water. The output of the propylene reactor comprises a propylene stream. Typical methods yield byproducts which include light paraffins, ethylene, butylene, and a small amount of fuel gas. Water is also present in the output of the propylene reactor. After the reactor, a distillation is required to remove the water from the hydrocarbons. In some embodiments of the methods of the invention, the water is fed back to the slurry preparation and gasifier.

In some embodiments, the output of the propylene reactor further comprises water, which is typically in the form of steam. In such embodiments the steam may be separated from the output stream and recycled back to the gasification reactor.

In some embodiments, the methods and apparatus of the invention further comprise a hydrocarbon reactor (which may also be referred to herein as a "diesel reactor"). In some such embodiments, the hydrocarbon reactor is configured to accept an output stream from the propylene reactor. In such embodiments, the hydrocarbon reactor is in fluid/gaseous communication with the propylene reactor. Typically, the stream that enters the hydrocarbon reactor comprises propylene, and the hydrocarbon reactor converts the propylene to heavier hydrocarbons. In particular, in some embodiments the hydrocarbon reactor converts propylene to a hydrocarbon mixture suitable for use as a transportation fuel such as JP-8, kerosene, automotive gasoline, or the like. Additional components may be added to the hydrocarbon reactor as needed. A variety of methods are known in the art for converting propylene to higher order hydrocarbons, and such methods may be used in conjunction with the present invention. In some embodiments, the output of the hydrocarbon reactor is JP-8. In some embodiments, the output of the hydrocarbon reactor is suitable for use as automotive diesel fuel. Typically, product hydrocarbons undergo a final distillation to recover the desired materials (e.g., JP-8 or other transportation fuels). In the methods of the invention, the residual hydrocarbons from such purifications can either be recycled back to the gasifier to be decomposed into syngas or sold as fuels.

Alternatively, the output from the methanol reactor can be directly fed to the hydrocarbon reactor (i.e., no propylene reactor is present). In such embodiments, the hydrocarbon reactor converts the methanol directly to hydrocarbon fuels. Methods for converting methanol to hydrocarbon fuels are known, and any such process may be employed as desired. For example, using a zeolite catalyst methanol can be converted to hydrocarbon fuels such as gasoline fuel.

Materials and Inputs

Inputs and materials used in the processes of the invention include a carbonaceous material, a hydrogen source, an oxidant, energy in the form of heat, and an optional catalyst. Each of these components is described in more detail in the following paragraphs.

The methods of the invention involve conversion of carbonaceous materials to hydrocarbon fuels. Suitable carbonaceous materials include coal (lignite, sub-bituminous, bituminous, and anthracite), petroleum and petroleum residues (e.g., refining residues), oil shale, coke, peat, asphalts, or combinations thereof. In some preferred embodiments, the carbonaceous material is a lower rank coal such as lignite, or sub-bituminous coal. As mentioned previously, coal is used throughout this application as an exemplary carbonaceous material, but such use is merely for ease of description and is not intended to be limiting.

In some embodiments of the methods of the invention, the product syngas composition is controlled by adding a hydrogen source to the gasifier. Because many sources of carbonaceous materials are rich in carbon but poor in hydrogen, the hydrogen source allows an increase in the ratio of $H_2/CO$ in the syngas output. In some embodiments, the hydrogen source is a hydrocarbon. In some embodiments, the hydrogen source is methane. The methane may be obtained from any suitable source. For example, the methane may be coalbed methane (i.e., methane extracted from coal deposits), or methane from natural gas fields, or methane captured from solid waste landfills or from animal farms (e.g., methane from ruminant farms such as cattle belch methane). The methane may also be recaptured methane generated downstream and recycled to the gasifier, as described herein. Other sources of methane and any combination of the above-mentioned sources may be used. As mentioned previously, the methanol reactor portion of the methods and apparatus of the invention convert syngas to methanol, and the output of the methanol reactor typically comprises a mixture of methanol and methane. This methane may be separated from the methanol;

accordingly, in some embodiments, the methane fed to the gasification further comprises methane recaptured and recycled from the output stream of the methanol reactor.

In some embodiments, the hydrogen source is another hydrocarbon (e.g., ethane, propane, etc.) that is rich in hydrogen relative to the coal used in the processes of the invention. In some embodiments, the hydrogen source is a mixture of various compounds, such as natural gas or biogas. In some embodiments, the hydrogen source is a combination of one or more of the abovementioned sources, such as methane and biogas.

Accordingly, in some embodiments, the methods disclosed herein use methane as a hydrogen source in converting coal to transportation fuels. Methane is advantageous for a variety of reasons, including: (i) methane has a high H/C ratio; (ii) methane provides more energy to the process than traditional hydrogen sources such as water; (iii) coal bed methane and other sources of methane can be used; and (iv) the overall impact on the environment is positive if coal bed methane is captured and used (as opposed to venting it to the atmosphere during coal mining). Using methane as the hydrogen source, a simplified mass balance for the overall process is as follows, where the overall process produces, rather than consumes, water:

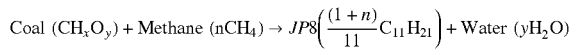

$$\text{Coal } (CH_xO_y) + \text{Methane } (nCH_4) \rightarrow JP8\left(\frac{(1+n)}{11}C_{11}H_{21}\right) + \text{Water } (yH_2O)$$

The method is flexible because the methane feed rate may be varied (n) depending on the coal's hydrogen content (x).

In some embodiments, hydrogen gas is added to the gasifier as a hydrogen source. Hydrogen gas may be the sole hydrogen source, but more commonly it augments another hydrogen source such as methane. The hydrogen may be obtained from any suitable source, such as a water gas shift (WGS) unit. In some embodiments, the recycle stream from the methanol reactor contains hydrogen gas (in addition to methane) which is added to the gasifier. In some embodiments, up to 50% of the total volume of gases fed to the gasifier is hydrogen gas, although lesser amounts (such as up to 40%, or up to 30%, or up to 20%, or up to 10%) are also possible.

An oxidant is provided to the gasifier because the carbonaceous material and hydrogen source typically lack sufficient oxygen for conversion to CO and $H_2$ in suitable ratios.

In some embodiments, the oxidant that is fed to the gasification reactor is water. Although the inventive processes include instances where additional or alternative oxidizing agents are added (e.g., an oxidizing catalyst, oxygen gas, etc.), in some preferred embodiments water is the only oxidant fed to the gasifier. In preferred embodiments, the water is in the form of high temperature steam. For example, the steam may be added to the gasification reactor at a temperature of greater than 400° C., or greater than 500° C., or greater than 600° C., or greater than 700° C., or greater than 800° C., or greater than 900° C., or greater than 1000° C., or greater than 1100° C., or greater than 1200° C., or greater than 1300° C., or greater than 1400° C. Alternatively, the steam may be characterized as high pressure. For example, pressures of between about 200 psia and 1500 psia (or greater), or between 400 psia and 1000 psia, are suitable. For example, the pressure of the steam may be greater than 200 psia, or greater than 400 psia, or greater than 600 psia, or greater than 800 psia, or greater than 1000 psia, or greater than 1500 psia. Also for example, the pressure may be less than 1500 psia, or less than 1000 psia, or less than 500 psia.

The water oxidant may be obtained from any suitable source. In preferred embodiments, the water fed to the gasification reactor comprises, in whole or in part, water recycled (i.e., recaptured) from the propylene reactor. That is, the output of the propylene reactor, which comprises water and hydrocarbons, is separated into components and the resulting water is fed back to the gasification reactor. Overall, in some embodiments, the systems of the invention suitable for converting coal to hydrocarbon fuels are substantially water-neutral, meaning that there is little or no net loss or gain of water when all reactions are taken into account. In some embodiments, the systems of the invention are water positive, meaning that there is a net production of water when all reactions are taken into account. It will be appreciated, however, that even when an overall process of the invention is water neutral or water positive, there may be a need to supplement one or more of the process reactions with additional water due to a variety of factors (e.g., loss of water due to incomplete recovery, inefficient recycling, water leaks, etc.). Since water is recycled to the gasifier from downstream processes, it may also be necessary to add water upon initial start-up of the gasifier. Typically, however, when the entire process from gasification to production of transportation fuel is considered, water consumption relative to coal consumption is less than about 10 mol % (i.e., for every mole of converted coal there is less than 0.1 mol of water consumed), or less than about 5 mol %, or less than about 1 mol %. Furthermore, in some embodiments, the process is water positive, and water production relative to coal consumption is greater than about 1 mol % (i.e., for every mole of converted coal there is produced 0.01 mol of water), or greater than about 2 mol %, or greater than about 5 mol %, or greater than about 10 mol %, or greater than about 20 mol %, or greater than about 25 mol %, or greater than about 40 mol %.

In some embodiments it may be necessary to use an oxidizing agent for the purpose of driving combustion of methane and/or coal within the gasifier, such as when additional heat is needed within the gasifier (see below for further details). The oxidizing agent for combusting methane and/or coal may be selected from steam, oxygen gas, catalytic oxidizing agents, and combinations thereof. When a catalytic oxidizing agent is used, the agent can be regenerated and reused.

In some embodiments, heat energy is supplied to the gasifier and/or one or more of the reactants that are fed to the gasifier. In some embodiments, the heat energy is supplied via an electrical heat-producing means, examples of which include screen heaters, plasma arc torches, and the like. The electrical heat-producing means of the invention may be supplied with electricity that is generated by any suitable means, although renewable energy sources are preferred in some embodiments. Examples of renewable energy sources include wind, solar, geothermal, hydroelectric, and ocean waves. Although less preferred, other sources such as combustion of biomass or traditional non-renewable sources such as coal or petroleum may also be used to supply electric energy to the apparatus of the invention. Furthermore, any combination of these and other sources of electric energy may be used.

In the alternative or in addition, heat energy may be supplied to the gasifier by oxidation of a carbonaceous material. For example, oxidation of biogas or methane via an oxidation catalyst can be used to generate heat in the gasifier.

In some embodiments, the heat energy is used to heat one or more of the reactants fed to the gasifier. The reactant(s)

may be supplied heat energy as they pass the inlet port to the gasifier, before they reach the inlet port, or after they have entered the gasifier reaction chamber, or any combination thereof. For example, in some embodiments, a screen heater or plasma arc torch is disposed at an inlet port to the gasifier, and one or more of the reactants are fed to the gasifier by passing through the heater. Alternatively or in addition, the gasifier reaction chamber itself may be heated by an electrical heat generating means. An example of such an embodiment includes electrical resistors disposed throughout or upon the walls of the reaction chamber.

The electrical energy may be used to heat water supplied to the gasifier. In some embodiments, the water supplied to the gasifier is in the form of steam, and the electrical heat generating means increases the temperature of the steam as described above. In some embodiments, the water supplied to the gasifier is in the form of liquid water, and the electrical heat generating means raises the temperature of the water (and, in some embodiments, converts the water to steam).

In some embodiments, the electrical energy is used to heat methane supplied to the gasifier. The methane may be heated prior to or after combination with coal particles, and prior to or after introduction to the gasifier reaction chamber. In some embodiments, the electrical energy is used to heat coal particles supplied to the gasifier. The coal may be heated prior to or after combination with methane, and prior to or after introduction to the gasifier reaction chamber. In some embodiments, the electrical energy is used to heat both methane and coal particles supplied to the gasifier.

In some embodiments it may be desirable or necessary to generate heat energy via oxidation of the methane and/or coal. Such oxidation may occur prior to or within the gasifier. When the oxidation occurs within the gasifier, it may be further necessary to add an oxidizing agent to the gasifier. Suitable oxidizing agents for such methods are described above. In some embodiments, any $CO_2$ generated by the combustion of methane and/or coal within the gasifier is retained (rather than separated and vented) and consumed in downstream processes as described herein, such that the overall process of coal liquefaction does not produce $CO_2$.

Outputs and Products

The primary output of the gasification reactor is a syngas product, and the syngas product is converted in downstream processes to additional products such as transportation fuels. In the process of such conversion, and as described herein, various materials are prepared (e.g., methanol, propylene, hydrocarbons) as intermediates. Such intermediates may also be considered products and/or raw materials for additional processes not mentioned herein.

In some embodiments, and as mentioned elsewhere herein, an output of the gasification reactor is a gaseous mixture that comprises CO and $H_2$ and is commonly referred to as syngas. The exact composition of the syngas output will depend on the reactants fed to the gasifier, and it will be appreciated that the syngas composition can be controlled by appropriately modifying the input to the gasifier. For example, the amount of $H_2$ relative to CO in the syngas can be increased by increasing the concentration of methane relative to coal. The amount of $H_2$ relative to CO can also be increased by modifying the coal source—i.e., using a lower ranked coal that contains a higher hydrogen concentration. Typically, the methods and apparatus of the invention do not require or involve addition of $H_2$ gas to the gasifier in order to achieve the desired syngas composition. Furthermore, typically, the methods and apparatus of the invention do not involve adding water to the gasifier inlet stream in order to achieve the desired syngas composition (although water may be present in the form of steam and act as an oxidant, as described in more detail herein).

Generally, the syngas output of the gasifier according to the invention comprises $CO/H_2$ in a molar ratio of between 0.35/1 and 2.5/1. In some embodiments, the $CO/H_2$ ratio is greater than 0.35/1, or greater than 0.5/1, or greater than 1/1, or greater than 1.5/1, or greater than 1.8/1. In some embodiments, the CO/H2 ratio is less than 2.5/1, or less than 2.3/1, or less than 2/1, or less than 1.5/1, or less than 1/1. In some embodiments of the production of hydrocarbon fuels according to the invention, the syngas output of the gasifier according to the invention typically comprises $CO/H_2$ in a molar ratio of between 1.5/1 and 2.5/1, or between 1.7/1 and 2.3/1, or between about 1.9/1 and about 2.1/1. For example, the syngas output of the gasifier may comprise $CO/H_2$ in a ratio of about 1.9/1 or about 2.0/1, or about 2.1/1. In some preferred embodiments, the syngas output comprises a $CO/H_2$ ratio suitable for forming methanol in a methanol reactor. As described previously, the syngas content can be modified by changing the ratio and/or composition of input materials (e.g., using relatively more methane, or relatively lower rank coal, etc.). This is particularly useful because different target products downstream (e.g., aviation fuels, automotive fuels, etc.) may require different syngas compositions for maximum conversion efficiency.

In addition to CO and $H_2$ (and various impurities as described above), the syngas output of the gasifier may comprise one or more components such as $CO_2$ and water. Water and $CO_2$ are typically carried through the apparatus into the methanol reactor where they are either consumed or recycled back to the gasifier.

In some embodiments, the syngas output of a gasifier according to the invention is substantially free of nitrogen gas. By "substantially free" is meant that the amount of nitrogen gas relative to CO is less than 5 mol %, or less than 3 mol %, or less than 1 mol %, or less than 0.5 mol %. When measured as a percentage of the overall gaseous output of the gasifier, the amount of nitrogen gas is preferably less than 10 mol %, or less than 5 mol %, or less than 3 mol %, or less than 1 mol %.

In some embodiments, the syngas output of a gasifier according to the invention is substantially free of oxygen gas. Again, by "substantially free" is meant that the amount of oxygen gas relative to CO is less than 5 mol %, or less than 3 mol %, or less than 1 mol %, or less than 0.5 mol %. When measured as a percentage of the overall gaseous output of the gasifier, the amount of oxygen gas is less than 10 mol %, or less than 5 mol %, or less than 3 mol %, or less than 1 mol %.

The outputs of the methanol reactor and propylene reactor are described previously. As mentioned, such products may be used as intermediates in the production of transportation fuels, as intermediates in the production of other products, or as final products without further modification. Recycling of components wherever possible is utilized by the apparatus of the invention. Products from one stage in the system are isolated and returned to a previous stage where appropriate. For example, and as mentioned, the methanol product from the methanol reactor typically contains residual methane, and the processes of the invention comprises separating the methanol from the residual methane and recycling the residual methane to the gasification reactor to react with additional carbonaceous material.

The syngas product may be converted through a methanol intermediate to transportation fuels according to the methods disclosed herein. Preferred transportation fuels include jet fuels (e.g., JP-8, Jet-A, JP-5, kerosene, etc.), automotive fuels (diesel, gasoline, etc.), watercraft fuels, and the like. The jet fuel JP-8 is described herein as having the formula $C_{11}H_{21}$, although it will be appreciated that this is only an approximation and an average formula. The transportation fuel products prepared by the methods herein may be further modified and/or formulated with additives as desired.

Operation and Operating Conditions

In some embodiments, the methods and apparatus of the invention provide for gasification of coal in a methane-blown gasifier, wherein steam is used as the primary oxidant. By "methane-blown" is meant that the coal particles are carried into the gasifier by a stream of methane gas. In preferred embodiments, the gasifier is not air-blown or oxygen-blown.

A stream of coal particles entrained in methane is referred to herein as an "input stream" for the gasifier. Typically, steam is added to the input stream prior to the input stream enters the gasifier reaction chamber. Alternatively, the input stream may be mixed with steam as it enters the gasifier reaction chamber.

In some embodiments, during operation of a gasifier according to the invention, the reaction chamber of the gasifier comprises less than 5 mol %, or less than 3 mol %, or less than 1 mol % of nitrogen gas, and/or less than 5 mol %, or less than 3 mol %, or less than 1 mol % of oxygen gas. In some embodiments, during operation of the gasifier, the reaction chamber is substantially free of nitrogen gas, oxygen gas, or both.

The hydrogen source is added to the gasifier in order to provide complete conversion of the coal to syngas, as described herein. Additionally, when the hydrogen source is a hydrocarbon, some of the carbon from the hydrocarbon is converted to CO in the gasifier. In some embodiments, little or no carbonaceous material and little or no hydrocarbon hydrogen source are combusted within the gasifier. For example, in some embodiments, when methane is used as the hydrogen source, substantially none of the methane that is input to the gasification reactor is combusted within the gasifier. In some embodiments, less than 25%, or less than 20% or less than 15%, or less than 10%, or less than 5%, or less than 3%, or less than 1% of the methane is combusted within the gasification chamber. Similarly, in some embodiments, substantially none of the coal that is input to the gasification reactor is combusted within the gasifier. In some embodiments, less than 25%, or less than 20% or less than 15%, or less than 10%, or less than 5%, or less than 3%, or less than 1% of the coal is combusted within the gasification chamber. In some embodiments, it has been observed that char particles catalyze the conversion of methane to syngas, and thus the degree of conversion depends on the coal density in the reaction zone.

In some embodiments, component(s) of the input to the gasifier is/are heated prior to entering the reaction chamber. For example, the steam, methane, or both may be heated, preferably using the means for supplying electrical heat energy described herein.

In some embodiments, the internal gasifier temperature during operation is maintained above 500° C., or above 600° C., or above 700° C., or above 800° C., or above 900° C., or above 1000° C., or above 1100° C., or above 1200° C., or above 1300° C., or above 1400° C., or above 1500° C. By the term "internal gasifier temperature" is meant the average temperature of the gaseous components within the gasifier reaction chamber at the point where the temperature is measured. Typically, internal gasifier temperature is measured at or near the bottom of the gasifier, or near to where the reactants enter the gasifier. In some embodiments, rather than monitoring the internal gasifier temperature, the temperature of the input stream(s) can be measured and maintained as desired. For example, in some embodiments, the temperature of the steam and/or methane stream(s) is/are individually maintained at above 500° C., or above 600° C., or above 700° C., or above 800° C., or above 900° C., or above 1000° C., or above 1100° C., or above 1200° C., or above 1300° C., or above 1400° C., or above 1500° C. Such temperatures may be measured just before the stream(s) enter the gasifier reaction chamber or just after the stream(s) enter the reaction chamber. It will be appreciated that these temperature values may be obtained and maintained by adjusting the amount of electrically-generated heat energy that is applied to the system, as described above.

In some embodiments the gasifier is operated at an internal gasifier pressure of greater than 1 atm. For example, the gasifier is operated at an internal gasifier pressure in the range of about 1 atm to about 100 atm (or greater), as discussed above with respect to the pressure of steam used in the gasifier. The term "internal gasifier pressure" refers to the average pressure of the gaseous components within the gasifier reaction chamber at the point where the pressure is measured.

The overall heat of reaction may be calculated using reported heating values for coal and the heats of formation for the various reactant and products. The results of these calculations are shown in Table 1.

TABLE 1

Relative amounts of methane consumed and water and JP-8 (as $C_{11}H_{21}$) produced, plus the heats of reaction for different types of coal.

| | Peat | Lignite | Bituminous | Anthracite |
|---|---|---|---|---|
| Coal ($CH_xO_y$) | 1 | 1 | 1 | 1 |
| $CH_4$ | 0.781 | 0.751 | 0.652 | 0.735 |
| $H_2O$ | 0.439 | 0.230 | 0.085 | 0.027 |
| $C_{11}H_{21}$ | 0.162 | 0.159 | 0.150 | 0.158 |
| $\Delta H_{rxn}$ | −60.0 | −39.2 | −27.8 | −13.0 |

In all cases, $\Delta H_{rxn}$ is negative (exothermic) for the overall simplified process. This indicates that, with perfect heat integration, the overall process would produce heat; that is, no additional energy would be required. However, even though the overall reaction is exothermic, additional energy is required at the gasifier to carry out endothermic reforming reactions (i.e., production of syngas) at high temperatures. This additional energy can be added to the system in a variety of ways, and preferably using electrically generated heat energy as described in more detail herein.

In some embodiments of the methane-and-steam-blown coal gasifiers according to the invention, both coal gasification and steam reforming of methane proceeds simultaneously. Steam reforming of methane produces hydrogen from hydrocarbons and, as in the coal gasifiers described herein, is carried out at high temperature and pressure (e.g., 800+° C. and 20+ bar). Additionally, higher temperatures yield higher conversions of methane.

As mentioned previously, conversion of coal to syngas is an endothermic reaction. A variety of options exist for providing energy to the gasifier, one of which (electrical energy) having been discussed previously. Generally, the options include: (A) partial combustion of methane in air to form CO and $H_2$; (B) complete combustion of methane in air to form $CO_2$ and $H_2O$; (C) combustion of biomass in air; (D) provide electricity via a $CO_2$ neutral power source; and (E) provide electricity via a conventional power source. Option (D) was discussed previously and is the preferred option. However, where appropriate or necessary, the energy provided to the gasifier can be augmented by any of the other options. For example, in some embodiments the energy provided to the gasifier is generated by a combination of renewable (e.g., hydroelectric, hydrothermal, solar, wind, etc.) and non-renewable (e.g., petroleum, coal, etc.) energy sources. Advantages and disadvantages of these options are discussed in the following paragraph.

Option A utilizes the energy created by the partial oxidation of methane in air to form CO and $H_2$ for the production of methanol. This reaction is exothermic and provides the necessary energy to maintain the gasifier's high operating temperature. The use of air requires a larger gasifier per barrel of JP-8 than oxygen blown gasifiers. In addition, the syngas cleanup processes and methanol reactors have to be larger to handle the large nitrogen flow rates. After the methanol reactor, the nitrogen and un-reacted methane are separated. The nitrogen is vented to the atmosphere while the methane is recycled back to the gasifier. Option B utilizes the complete combustion of a small methane stream to provide the required energy. This creates a small amount of $CO_2$ emissions, but the highly exothermic reaction (802 kJ/mol $CH_4$) requires 25 times less methane to provide the same amount of heat as the methane reaction outlined in Option A. Option C utilizes a complete combustion of biomass to provide the required energy. As in Option B there is some $CO_2$ emission, but in this case it is assumed that the vast majority of the $CO_2$ is "recycled" by the growth of new biomass. Preferred biomass sources can most efficiently be converted to energy with minimal impact on the environment. Option D utilizes a source of electrical energy that does not emit $CO_2$. Options include solar, geothermal, hydroelectric, wave, and wind-generated power. The electrical power can heat the gasifier, for example, utilizing resistance heating. Each option requires varying amounts of methane or an alternative source of energy. The magnitudes of these inputs are estimated and summarized in the Table below.

TABLE 2

Estimated co-feed requirements of approaches to heating the gasifier.

| | Option A | Option B | Option C | Option D | Option E |
|---|---|---|---|---|---|
| Methane Feed (kg/kg coal) | 2.14 | 0.41 | 0.41 | 0.41 | 0.41 |
| C from methane/C from coal in JP-8 product | 2.50 | 0.68 | 0.68 | 0.68 | 0.68 |
| Combusted Methane (kg/kg coal) | — | 0.08 | — | — | — |
| Combusted Biomass (kg/kg coal) | — | — | 0.29 | — | — |
| Electrical Heating (MJ/kg coal) | — | — | — | 4.3 | 4.3 |

One factor to consider in the operation of the apparatus of the invention is sooting, which is a major issue affecting the viability of commercial methane reformers. At the temperatures of operation of gasifiers according to the invention, methane decomposes to soot. In other words, thermal decomposition of methane within the reaction zone generates carbon particulates that further catalyze the reaction, leading to rapid reactor clogging. Such sooting can be avoided by establishing a flow of steam and/or hydrogen prior to introducing methane in the reactor (i.e. the methane is mixed with steam or hydrogen prior to heating to high temperatures). Furthermore, a high hydrogen concentration was shown to be able to suppress soot formation.

In some embodiments, where coal is the carbonaceous material and methane is the hydrogen source, the methods of the invention provide for greater than 75% conversion of the methane and greater than 75% conversion of the coal to CO and/or $CO_2$ within the gasifier. For example, greater than 80% conversion, or greater than 85% conversion, or greater than 90% conversion, or greater than 95% conversion of the methane is achieved. Also for example, greater than 80% conversion, or greater than 85% conversion, or greater than 90% conversion, or greater than 95% conversion of the coal is achieved.

An embodiment of the invention is illustrated in block form in FIG. 1. In the figure, coal, water, and methane are fed to a gasifier. The output of the gasifier (comprising syngas and impurities) is fed to a cleanup stage, where impurities such as slag, ammonium, sulfur, and mercury are removed. The cleaned syngas product is fed to a methanol reactor, and the output of the methanol reactor comprises methanol and methane. The methane is separated and fed to a compressor before being added back to the gasifier. The methanol is sent to a propylene reactor, which outputs water and propylene. The water output of is recycled back to the gasifier, while the propylene output is fed to a diesel reactor and converted to jet fuel (JP-8).

Figure 2:
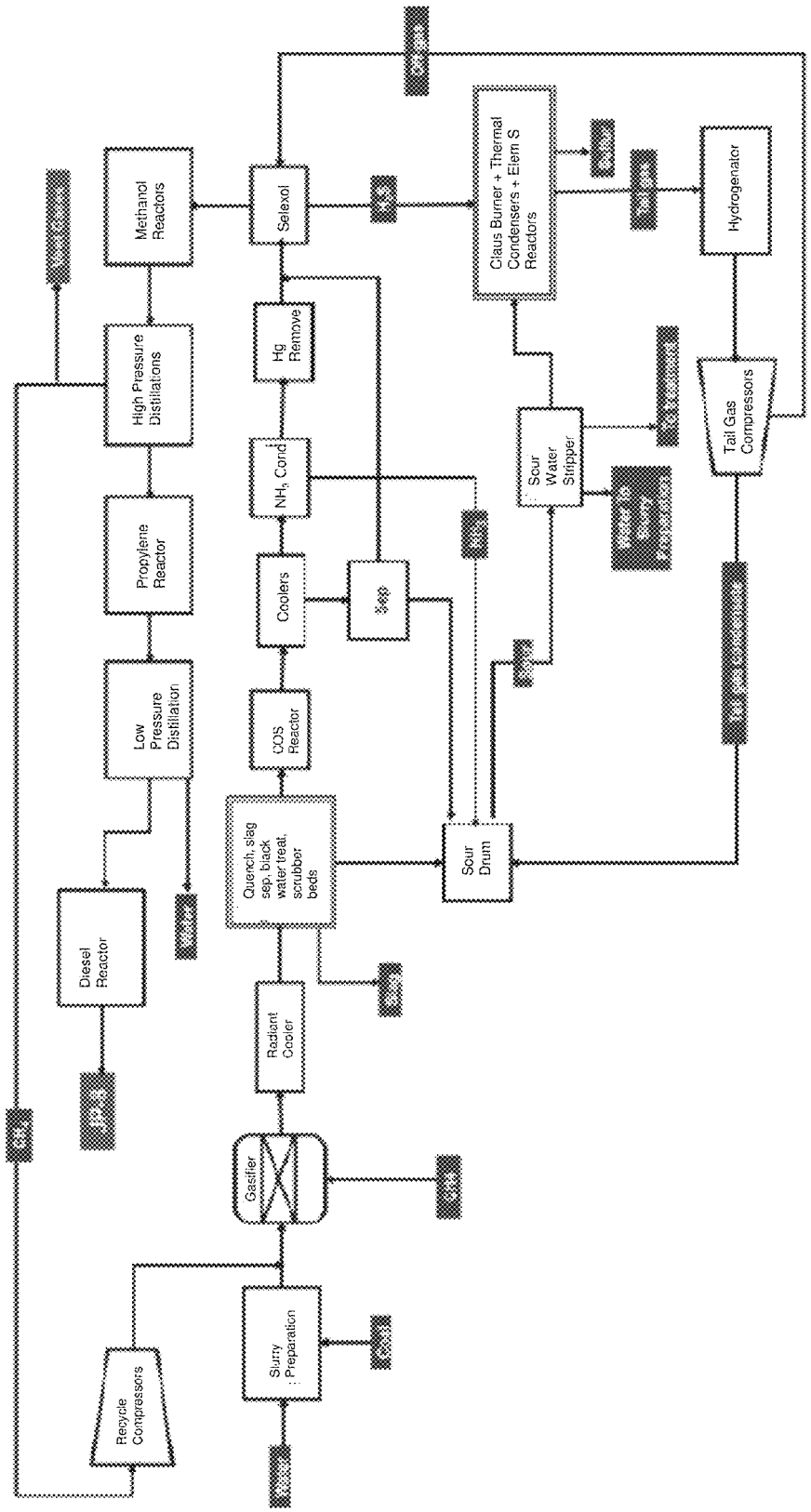
In FIG. 2, a block diagram provides a more detailed description of a process according to the invention for preparing transportation fuel from coal and methane.

A more detailed block diagram of a process according to the invention is shown in FIG. 2.

Figure 3:
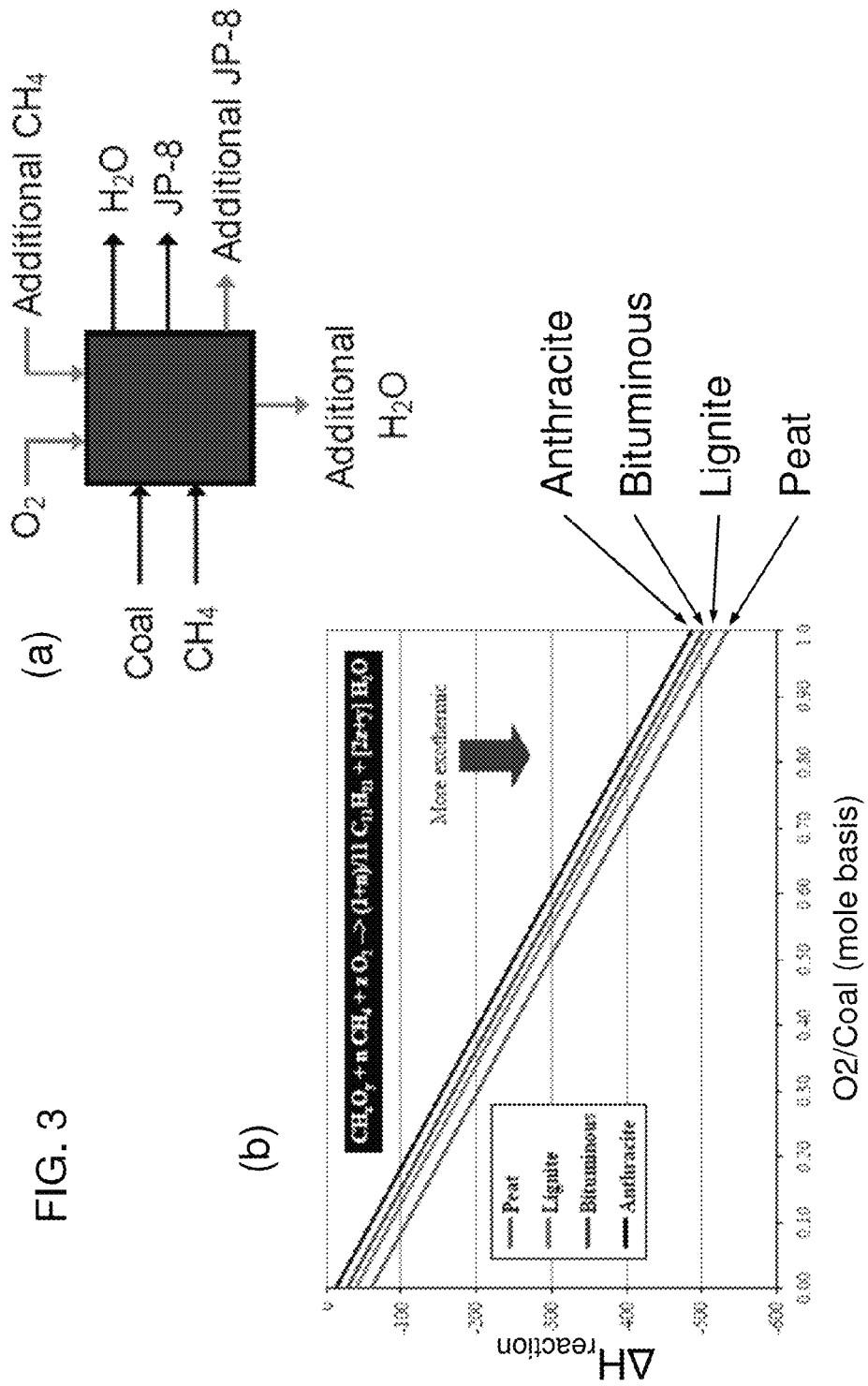
In FIG. 3, there is provided a schematic diagram and equation illustrating the mass balance of a coal-conversion system according to the invention, as well as a graph showing heat of reaction as a function of $O_2$/coal ratio for various types of coal.

As mentioned previously, oxygen gas can be used as the oxidizing agent in the methods of the invention. Such an embodiment is illustrated in FIG. 3, where (a) and (c) provide a block diagram and an equation, respectively, that show the inputs and outputs. Coal, methane, and oxygen are inputs to the process, while water and JP-8 are outputs of the process. In (b), the heat of reaction is shown as a function of $O_2$/coal ratio for various types of coal. For any given ratio of $O_2$/coal, lower ranks of coal provide a more exothermic reaction.

The methods and apparatus according to the invention produce syngas in a new manner that is preferable to previous methods for producing syngas. Furthermore, the syngas product is ideally suited for the production of hydrocarbon fuels. Some of the processes mentioned herein for converting syngas to transportation fuels are known generally (e.g., conversion of syngas to methanol, conversion of methanol to propylene, and conversion of propylene to hydrocarbon fuels). The known individual processes are uniquely adapted and integrated into the overall processes of the invention by taking advantage of byproducts and selecting processes that are most suitable (e.g., selecting a methanol-to-propylene conversion method that produces water as a byproduct and recycling the water, thereby making the methods of the invention water neutral). Operating conditions for each stage in the overall processes of the invention may be optimized to ensure that the various stages work together. This allows tailoring of the overall processes to provide maximum environmental friendliness, energy-efficiency, atom-efficiency, and yield of desired products.

In some embodiments, therefore, there is provided herein methods for producing transportation fuels such as JP-8 from coal by an indirect route that uses methanol as an intermediate. The production of hydrocarbons from methanol is a clean process that produces water as a byproduct, which in turn is recycled to a steam-blown gasifier with a co-feed of coal and methane. This approach is beneficial because: (1) a steam-blown gasifier requires less capital investment as it avoids the cost of an air separation unit; and (2) the co-feed of methane results in a syngas product with an appropriate amount of hydrogen without the need of a water-gas shift (WGS) unit, which further reduces capital cost, $CO_2$ production, and water consumption. By not using coal to produce hydrogen via WGS, the methods also increase the carbon yield of the coal to JP-8 transformation, thus reducing the size of the gasification unit. Furthermore, the methods are carbon-efficient, as all or nearly all of the carbon in the coal is incorporated into the fuel product, and nearly 60% of the carbon in the product is from the coal (base case).

Furthermore, some benefits of the methods disclosed herein include: improvements in the operating range of gasifier operation with a simultaneous lowering of the capital costs; provision of a clean syngas for the synthesis of transportation fuels such as JP-8 (which previously required advanced gas cleaning technologies to prevent the poisoning of catalysts and avoid introducing unacceptable environmental contaminants into the final product); the elimination, or at least substantial reduction in the size of, an air separation unit (ASU); and reducing the size of downstream equipment by eliminating or substantially reducing the volume of nitrogen in the syngas (dilution is avoided by using methane to blow the coal into the gasifier). Furthermore, the methane can be received from a pipeline at a pressure which limits or even eliminates the need to compress the feed gas. Furthermore, the elimination (or substantial reduction) of extra oxygen greatly reduces the formation of carbon dioxide that ultimately needs to be converted in downstream operations. Some advantages of the methanol-to-diesel route described herein (compared, for example with the FT synthesis route) include increased product control and no additional production of $CO_2$. In fact, using the methanol route allows any $CO_2$ produced in the gasifier to be consumed in the methanol reactor to form methanol and water.

The materials, methods, and apparatus herein described are exemplary of the invention, but are not necessarily limited by the language used in their description. For example, in some embodiments described above, the output of the methanol reactor has a methane component, and the methanol reactor is described as having a means for separating the methanol from the methane at the output of the reactor. It will be appreciated, however, that such separation may also be accomplished at the input portion of the propylene reactor. This and other variations of the invention will be apparent to those of skill in the art based on the description provided herein.

All patents, patent applications, and publications mentioned herein are hereby incorporated by reference in their entireties. However, where a patent, patent application, or publication containing express definitions is incorporated by reference, those express definitions should be understood to apply to the incorporated patent, patent application, or publication in which they are found, and not to the remainder of the text of this application, in particular the claims of this application.

It is to be understood that while the invention has been described in conjunction with the preferred specific embodiments thereof, that the foregoing description as well as the examples that follow, are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains.

EXAMPLES

Example 1

Optimization of Carbon Conversion

Char conversion is the principal factor in determining the size of the gasifier, which is the single most expensive item in the Coal to Liquid (CTL) process. Preferred methods for CTL that can cost-effectively produce transportation fuels such as JP-8 should achieve 90% conversion of the fed coal.

Experimental data shows that coal conversion increases with temperature. Coal conversions approaching 80% was obtained at the relatively moderate temperature of 1200° C., and at 1500° C. coal conversions as high as 93% were obtained. Furthermore, we studied the potential inhibition effects of a 3:1 mixture of $H_2$:CO at 1300° C. and observed in all cases coal conversions higher than 85%, clearly demonstrating negligible inhibitory effects. Furthermore, conversions higher than 90% can be obtained at 1400° C. when a steam to carbon ratio of 3.0 is used.

The potential inhibition effects of high concentration of CO or $H_2$ in steam gasification was also studied in experiments performed at 1200° C., and it was concluded there was a small inhibition effect in the presence of high concentrations of $H_2$, but that the effect was not large (−10% conversion) and could be easily overcome by operation at higher temperatures.

In summary: High char conversion can be achieved within the short residence time of an entrained flow gasifier according to the invention.

Example 2

Methane-Blown Gasifier Operated at High Temperature

When gasification experiments were performed at 1200° C. using different hydrogen concentrations, an inverse correlation between the amount of hydrogen and the amount of soot formed was observed. Since 30% concentrations of $H_2$ were shown to reduce sooting to an acceptable level, that level was chosen for most of our series of experiments. Running at high hydrogen concentration has a small inhibitory effect in coal conversion, but this level of inhibition can be overcome by operation at higher temperatures.

Furthermore, in one series of experiments the coal loading was increased from 3.1% to 9.1%. A larger coal feeding system may be used to achieve coal loadings of up to 30%.

In summary, these experiments demonstrate a gas-blown coal injection system that operates stably at high temperature.

Example 3

Coal/Methane Loading Effects

Modeling calculations suggest that, at equilibrium, conversions of 90% should be achieved operating at 1400° C. In experiments, non-catalytic steam methane reforming reaches a conversion of 40% when operating at 1400° C. with 30% $H_2$ and a steam to coal ratio of 2.0. In the char-catalyzed reaction the reaction rate is at least partially governed by rate of transport to the char catalyst surface and it was anticipated that higher methane conversion would be observed at higher coal loadings. However, the steam reforming of coal under the reaction conditions not only produces CO, but also a significant amount of methane, effectively reducing the net methane conversion. At the highest coal loading tested (9.1%) the net effect observed has been the production of methane, rather than the consumption.

Two other factors have been identified that have an effect in methane conversion: (i) the steam to carbon ratio; and (ii) the amount of hydrogen. An increased steam to carbon ratio is equivalent to increasing the amount of oxidant in the system and it should favor methane conversion. An increase in the amount of hydrogen needed to prevent methane sooting can increase the amount of methane produced from coal and, at the same time, inhibit the steam catalyzed reforming of methane.

In summary: the reactor designs of the invention allow for a pre-reactor for methane steam reforming. In some cases, this allows for the simultaneous high conversion of methane and coal in the single reactor configuration. The output of the pre-reactor is the input for the main reactor where the coal is gasified.

Example 4

Reactor Design

In laboratory scale experiments, the gas feed system applies a slight amount of preheating to the gases through external heating tapes wrapped around the gas inlet plumbing. Three heaters delivering approximately 144 W each are used on the gas delivery tubing while a separate power supply heats the steam generation section to 290° C. However, heat losses are high and there is low surface area for heat transfer.

The inclusion of a gas preheating stage allows accomplishment of two things: (1) it allows further increases of the enthalpy of the system without exceeding the material temperature limit; and (2) it allows testing heat integration concepts utilizing theoretical recycle streams.

An important consideration is the conduction media to be used within the heating zone; to be useful, it must be conductive, chemically inert to the feed gases, thermally stable at the requisite temperatures, and have minimal impedance to the gas flow. One choice is to use quartz beads from $\frac{1}{32}$"-$\frac{1}{16}$" in diameter, since these meet all of the criteria. To prevent entrainment into the system, a series of mesh screens are installed at either end of the bed.

Example 5

System Optimization

Optimization of reaction conditions and development of the process may be carried out as an iterative process. Modeling software estimates equilibrium conditions at which the specified compositions are achieved. The conditions are verified in the batch reactor if necessary to find pressure, temperature, component yields, and an upper bound for the residence time of a full-scale gasifier. The laboratory gasifier provides initial kinetic data for a lower bound on residence time and potentially initial yield results. The results from the laboratory gasifier serve as inputs for the modeling software, which predicts a residence time and the product yields of a full-scale gasifier. As an added benefit, the software can model a variety of different gasifiers, including entrained flow, transport, fixed bed, and fluidized bed gasifiers. The results from the modeling can then be input into the process model.

Gasifier Experiments. A radiant coal flow reactor system is used for studying the pyrolysis, combustion, and steam gasification of coals and other solid fuels under pressures of up to 40 atm (see FIG. 12). In this system, steam is injected into the entrainment gas flow at concentrations and pressures typical of full-scale gasifier facilities (up to 25% by gas volume at 40 atm or more). The key advantage of this entrained flow facility is that all products can be captured and analyzed, resulting in close mass balances to useful tolerances. The facility is modified to study the methods of the invention such that methane, in combination with steam, is used as the entrainment gas.

What is claimed is:

1. A water-neutral process for liquefying a carbonaceous material and forming hydrocarbons, the process comprising:
    (a) combining the carbonaceous material with methane and water in a gasification reactor under conditions sufficient to convert the carbonaceous material, methane, and water to H2 and CO;
    (b) combining the H2 and CO from (a) with a catalyst in a methanol reactor under conditions sufficient to convert the H2 and CO to methanol;
    (c) combining the methanol from (b) with a catalyst in a reactor under conditions sufficient to convert the methanol to hydrocarbons and water; and
    (d) recycling the water formed in (c) to the gasification reactor to react with additional carbonaceous material and methane,
    wherein any $CO_2$ generated in step (a) is converted to methanol in step (b).

2. The process of claim 1, wherein the carbonaceous material is coal.

3. The process of claim 1, wherein the gasification reactor is supplied with electrically-generated heat energy.

4. The process of claim 1, wherein the hydrocarbons comprise propylene, and wherein the process further comprises isolating the propylene and combining the propylene with a catalyst in a reactor to form hydrocarbons in the molecular weight range of transportation fuels.

5. The process of claim 1, wherein the hydrocarbons are in the molecular weight range of transportation fuels.

6. The process of claim 2, wherein the coal/methane ratio is between about 1.75 and about 20.

7. The process of claim 2, wherein at least 75% of the methane and at least 75% of the coal is converted to CO or CO2 in the gasification reactor.

8. The process of claim 1, wherein at least a portion of the water in (a) is in the form of steam, and wherein the steam is added to the gasification reactor at a temperature greater than about 500° C.

9. The process of claim 1, wherein the H2 and CO product from (a) has a CO/H2 ratio in the range of 0.35/1 to 2.5/1.

10. The process of claim 1, wherein the contents of the gasification reactor are maintained above an average temperature of at least 1200° C.

11. The process of claim 1, further comprising adding an oxidation catalyst to the gasification reactor, wherein the catalyst reacts with a portion of the methane or carbonaceous material in the gasification reactor to generate heat.

12. The process of claim 2, wherein the methane is provided in the form of a gas stream and wherein the method further comprises entraining the coal in the methane gas stream.

13. The process of claim 1, wherein the overall process is CO2-neutral.

14. The process of claim 1, wherein the overall process consumes CO2.

15. A process for liquefying a carbonaceous material and forming hydrocarbons, the process comprising:
    (a) combining the carbonaceous material with methane and water in a gasification reactor under conditions sufficient to convert the carbonaceous material, methane, and water to syngas comprising H2 and CO;
    (b) combining the H2 and CO from (a) with a catalyst in a methanol reactor under conditions sufficient to convert the syngas to methanol;

(c) combining the methanol from (b) with a catalyst in a propylene reactor under conditions sufficient to convert the methanol to propylene and water; and (d) recycling the water formed in (c) to the gasification reactor, wherein any $CO_2$ generated in step (a) is converted to methanol in step (b).

16. The process of claim 15, wherein the gasification reactor receives electrical energy, and converts the electrical energy to heat energy.

17. The process of claim 15, wherein a hydrocarbon reactor receives propylene from the propylene reactor and converts the propylene to heavier hydrocarbons.

18. The process of claim 15, wherein the gasification reactor has an inlet that receives an entrained flow of the carbonaceous material in gaseous methane and an inlet that receives steam.

19. The process of claim 15, further comprising purifying the syngas produced in the gasification reactor.

\* \* \* \* \*